(12) United States Patent
Cigni

(10) Patent No.: US 8,939,685 B2
(45) Date of Patent: Jan. 27, 2015

(54) CUTTING TOOL

(75) Inventor: Emanuele Cigni, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 101 days.

(21) Appl. No.: 13/557,314

(22) Filed: Jul. 25, 2012

(65) Prior Publication Data
US 2013/0028669 A1    Jan. 31, 2013

(30) Foreign Application Priority Data

Jul. 25, 2011   (IT) ................................ FI2011A0153

(51) Int. Cl.
 B23C 5/28    (2006.01)
 B23C 5/10    (2006.01)
 B23C 5/00    (2006.01)

(52) U.S. Cl.
 CPC ............... *B23C 5/10* (2013.01); *B23C 2210/02* (2013.01); *B23C 2210/03* (2013.01); *B23C 2240/03* (2013.01); *B23C 2250/12* (2013.01)
 USPC .............................................. 408/57; 407/11

(58) Field of Classification Search
 USPC ........................... 407/11, 53; 408/57; 409/234
 See application file for complete search history.

(56) References Cited

U.S. PATENT DOCUMENTS

| 1,881,024 | A | * | 10/1932 | Lang | 175/327 |
| 4,795,292 | A | * | 1/1989 | Dye | 409/136 |
| 5,971,670 | A | * | 10/1999 | Pantzar et al. | 407/34 |
| 6,394,711 | B1 | * | 5/2002 | Brosius | 408/57 |
| 6,565,291 | B2 | * | 5/2003 | Harpaz et al. | 407/53 |
| 7,374,376 | B2 | * | 5/2008 | Jonsson et al. | 408/233 |
| 2006/0073744 | A1 | | 4/2006 | Jonsson et al. | |
| 2009/0142150 | A1 | | 6/2009 | Chu | |

FOREIGN PATENT DOCUMENTS

| EP | 0348371 A2 | 12/1989 |
| EP | 2233233 A1 | 9/2010 |
| JP | 2003251515 A | 9/2003 |
| WO | 2010143315 A1 | 12/2010 |

OTHER PUBLICATIONS

Italian Search Report and Written Opinion dated Mar. 8, 2012 which was issued in connection with Italian Patent Application No. FI2011A000153 which was filed on Jul. 25, 2012.

* cited by examiner

*Primary Examiner* — Will Fridie, Jr.
(74) *Attorney, Agent, or Firm* — GE Global Patent Operation

(57) ABSTRACT

A tool is provided. The tool comprises an interchangeable cutting portion and a holder to which the interchangeable cutting portion is adapted to be replaceably mounted. The interchangeable cutting portion comprises a first part with at least one cutting edge and a second part for connection to the holder, the second part being provided with a conical external abutment surface and an external cylindrical screw thread. The holder is provided with an internal cylindrical screw thread, to which the external screw thread is removably screwed, and a conical internal abutment surface, the conical external abutment surface and the conical internal abutment surface being mutually engageable for positioning the cutting portion and the holder relative to one another.

16 Claims, 1 Drawing Sheet

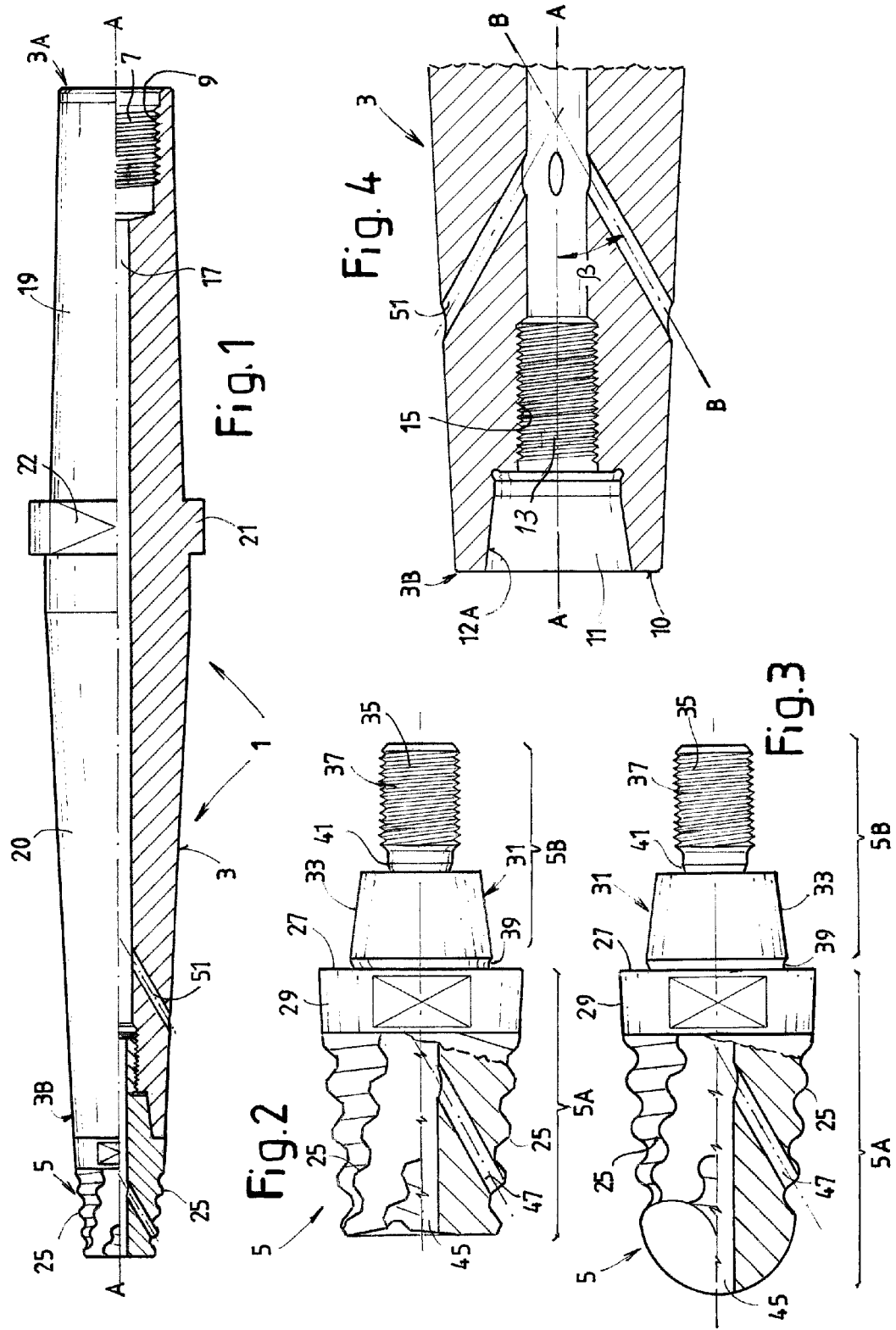

CUTTING TOOL

BACKGROUND OF THE INVENTION

The subject matter disclosed herein relates to tools, such as cutting tools for metal cutting machining. More specifically, the subject matter disclosed herein relates to cutting tools comprising a holder and an interchangeable cutting portion.

A cutting tool comprising an interchangeable cutting portion and a holder is disclosed in U.S. Pat. No. 5,971,670. The cutting portion comprises a first part provided with cutting edges and a second part provided with an external screw thread for connection to an internal screw thread provided in a female part formed in the holder. Cylindrical surfaces and planar abutment surfaces are provided for mutually positioning and stably fastening the two portions to one another. In the preferred embodiment the external and internal screw threads of this known tool are conical.

US publication 2006/0073744 discloses a similar cutting tool, which further comprises an axial passage extending through the holder and the cutting portion and is in fluid communication with apertures provided at the tip of the cutting portion, in order to dispense a coolant or lubricant liquid.

Both known tools require a double cylinder surface to achieve good run-out control during connection between the interchangeable cutting portion and the holder and need high precision manufacturing.

BRIEF DESCRIPTION OF THE INVENTION

In one embodiment, a tool comprising an interchangeable cutting portion and a holder to which said interchangeable cutting portion is adapted to be replaceably mounted is provided. The interchangeable cutting portion comprises a first part with at least one cutting edge and a second part for connection to said holder, said second part being provided with a external conical abutment surface and an external cylindrical screw thread. The interchangeable cutting portion is intended to perform chip removal machining of metal workpieces or the like, such as by milling, boring or other machining operation. The holder is in turn provided with an internal cylindrical screw thread, to which said external cylindrical screw thread is removably screwed when the interchangeable cutting portion and the holder are connected to one another. The holder further comprises a internal conical abutment surface co-acting with the external conical abutment surface of the cutting portion. The external conical abutment surface and the conical internal abutment surface are mutually engageable for positioning the cutting portion and the holder relative to one another.

The external cylindrical screw thread and the internal cylindrical screw thread are simpler to manufacture than the conical screw threads of the prior art. The two mutually engaging external and internal conical surfaces provide good run-out control during connection of the interchangeable cutting portion and the holder.

According to some embodiments, said external and internal screw threads are trapezoidal and self-centering threads.

According to some embodiments, the interchangeable cutting portion comprises a first axial abutment surface and said holder comprises a second axial abutment surface, said first axial abutment surface and said second axial abutment surface being mutually engageable for axially positioning the interchangeable cutting portion and the holder relative to one another. In some embodiments, the first axial abutment surface is formed on a planar side of a ring shoulder facing said holder and the second axial abutment surface is formed on a front planar end of said holder facing said interchangeable cutting portion. The first and second axial abutment surfaces are orthogonal to the axis of the tool. The first and second axial abutment surfaces are continuous annular surfaces. In other embodiments the axial abutment surfaces can be interrupted e.g. by radial indentations.

The external conical abutment surface of the interchangeable cutting portion can be arranged such as to project from said first axial abutment surface of said cutting portion.

The axial abutment surfaces and the internal and external conical abutment surfaces are arranged such that when the interchangeable cutting portion is threadedly engaged with the holder, both the axial abutment surfaces and the conical abutment surfaces are in mutual contact to provide mutual centering of the interchangeable cutting part with respect to the holder and tool rigidity.

In exemplary embodiments, the external cylindrical screw thread has an outer diameter smaller than a smallest diameter of the conical external abutment surface; and the internal cylindrical screw thread has a diameter smaller than a smallest diameter of said internal conical abutment surface.

According to an embodiment of the invention, the holder comprises at least one longitudinal passage for a coolant or lubricant fluid. A longitudinal passage should be understood as a passage extending along the longitudinal development of the holder and substantially parallel to the axis thereof. More than one passage can be provided, even though a single passage is sufficient and easier to manufacture. In exemplary embodiments the longitudinal passage extends from said internal cylindrical screw thread to an opposite end of said holder. In some embodiments, the interchangeable cutting portion comprises at least one duct which, when said interchangeable cutting portion is mounted on said holder, is in fluid communication with said longitudinal passage and in fluid communication with a side surface of said interchangeable cutting portion, near the at least one cutting edge. Near the cutting edge should be understood as positioned at a distance from the cutting edge sufficiently small for the lubricant or coolant fluid to be directed towards the machining area and specifically to cool or lubricate the cutting edge(s). In an exemplary embodiment of the invention, a plurality of ducts are provided. The number and position of the ducts can depend upon the shape, the number and the position of the cutting edges provided on the interchangeable cutting portion of the tool.

According to another aspect, the interchangeable cutting portion comprises a plurality of side holes in fluid communication with the duct and ending in different locations on the side surface of the interchangeable cutting portion near said at least one cutting edge.

According to another embodiment of the invention, the holder comprises at least one hole extending from said at least one longitudinal passage provided in said holder to a side surface of the holder. At least one hole of said holder ends on said side surface of the holder near said interchangeable cutting portion. Near means at such a distance from the interchangeable cutting portion that a jet of coolant or lubricant fluid flowing from said hole can reach the area of a workpiece being machined by the tool.

According to some embodiments, said at least one hole of the holder is diverging from an axis of said holder and oriented such as to direct a jet of coolant or lubricant fluid towards a machining area and in a direction diverging from the axis of the holder.

The provision of one or more holes in fluid communication with the longitudinal passage of the holder and surfacing on the side surface of the holder allows cleaning the machining area by means of one or more coolant or lubricant fluid jets, such that separate means for washing the machining are, such as nozzles arranged separately from the tool can be dispensed with. More efficient cleaning and better accessibility to the machining area are thus achieved.

According to exemplary embodiments, the holder comprises a plurality of said holes, which are uniformly spaced apart from one another, to improve the cleaning action.

According to a further aspect, the invention also concerns an interchangeable cutting portion for a chip removal tool intended to be connected to a holder, comprising a first part with at least one cutting edge and a second part for connection to said holder, said second part being provided with a conical external abutment surface and an external cylindrical screw thread.

The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 1 shows a partial side view and partial longitudinal section of a tool with an interchangeable cutting portion connected to a holder;

FIG. 2 shows an enlargement of the interchangeable cutting tool portion of FIG. 1 in a partial longitudinal section and partial side view;

FIG. 3 shows an enlargement of a different interchangeable cutting tool portion usable in conjunction with the holder, in a partial longitudinal section and partial side view similar to FIG. 2; and FIG. 4 shows an enlargement of the longitudinal section of the holder of FIG. 1, with the interchangeable cutting portion removed.

DETAILED DESCRIPTION OF THE EXEMPLARY EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

An embodiment of a tool 1 is shown in partial side view and partial longitudinal section in FIG. 1. The tool 1 is comprised of a holder 3 and an interchangeable cutting portion 5. The axis of the holder 3 is labeled A-A. When mounted on the holder 3, the axis of the interchangeable cutting portion 5 substantially coincides with the axis A-A, representing the rotation axis of the tool 1. In some embodiments, the holder 3 has an elongated shape with a first end 3A and a second end 3B. The first end 3A is provided with a threaded hole 7 with an internal cylindrical screw thread 9. The second end 3B has a planar axial abutment surface 10. A hole 11 with a frusto-conical wall 12 forming an internal conical abutment surface extends inwardly from said planar axial abutment surface 10 in the body of the holder 3. The hole 11 extends further at 13 in the interior of the holder. The cylindrical inner surface of the hole 13 is threaded to form an internal cylindrical screw thread 15. In some embodiments the internal cylindrical screw thread 15 has a trapezoidal auto-centering cross-section.

A longitudinally extending passage 17 extends from the hole 7 to the hole 13. The passage 17 can be used to feed a coolant or lubricant liquid towards the machining area.

In some embodiments the holder 3 has a first outer frustum-shaped surface 19 tapered towards the end 3A and a second outer frustum-shaped surface 20 tapered towards the end 3B of the holder 3. In an intermediate position between the first and second frustum-shaped surfaces 19, 20 the holder 3 has an annular projection 21 provided with flattened areas 22 intended as key grips for tightening and untightening the holder to a machine tool (not shown).

The interchangeable cutting portion 5 is comprised of a first, front part 5A and a second, rear part 5B. The first part 5A is provided with one or more cutting edges 25, the number, position and shape of which depend upon the kind of machining the interchangeable cutting portion is intended for. In an intermediate position the interchangeable cutting portion 5 is provided with a ring or annular shoulder 27. The ring shoulder forms a planar axial abutment surface co-acting with the axial abutment surface 10 of the holder 3. Between the ring shoulder 27 and the cutting edge(s) 25 a cylindrical or frusto-conical intermediate section 29 is arranged. Flattened portions 29A of the intermediate section 29 are provided along the peripheral surface thereof, as key grips for tightening and untightening the interchangeable cutting portion 5 with respect to the holder 3 by means of a suitable key (not shown).

Extending from the ring shoulder 27 is a frusto-conical projection 31 the outer surface of which forms a conical external abutment surface intended to co-act with the conical internal abutment surface 12 of the holder 3. A cylindrical appendage 35 extends from the frusto-conical projection 31. The cylindrical appendage 35 is provided with an external cylindrical screw thread 37 which is screwed into the internal cylindrical screw thread 15 of the holder 3 when the interchangeable cutting portion is engaged to the holder.

The cutting edge(s) 25 and the intermediate section 29 belong to the first part 5A of the interchangeable cutting portion 5, while the frusto-conical projection 31 and the externally threaded cylindrical appendage 35 belong to the second part 5B of the interchangeable cutting portion 5.

An annular groove 39 is provided between the ring shoulder 27 and the frusto-conical projection 31. A further annular groove 41 is provided between the frusto-conical projection 31 and the externally threaded cylindrical appendage 35.

In some embodiments, as shown in the drawings, the interchangeable cutting portion 5 comprises a duct 45 for a coolant or lubrication fluid. The duct 45 has an inlet opening on the front surface of the externally threaded cylindrical appendage 35 and, depending upon the shape of the cutting edges 25, can have an outlet opening on the front end of the part 5A of the interchangeable cutting portion 5 or be a blind hole. In both cases, the duct 45 can be in fluid communication with one or more side holes 47 surfacing on the outer side surface of the front part 5A of the interchangeable cutting portion 5.

When the interchangeable cutting portion 5 is to be connected to the holder 3, the threaded cylindrical appendage 35 is introduced into the hole 11 and the external cylindrical screw thread 37 engages the internal cylindrical screw thread 15. Rotation the interchangeable cutting portion 5 with respect to the holder 3 causes mutual engagement of the external and internal cylindrical screw threads 37 and 15, until the conical external abutment surface 33 abuts against the conical internal abutment surface 12A and at the same time the two axial abutment surfaces 10, 27 engage with one another. This on the one hand ensures centering of the cutting edges 25 with respect to the axis of the holder 3 due to the co-action of the conical abutment surfaces 33 and 12A and on the other hand provides rigidity to the tool, thanks to the co-action of the planar axial abutment surfaces 10, 27. A correct machining accuracy when manufacturing the tool ensures sufficiently small tolerances to achieve simultaneous contact between the pair of surfaces 10, 27 and 12A, 33.

In exemplary embodiments, the holder 3 is provided with at least one hole 51 extending from the longitudinal passage 17 to the outer frustum-shaped surface 20 of the holder 3. In the example shown in the attached drawings four angularly staggered holes 51 are provided. A different number and arrangement of holes 51 can be adopted instead of the one shown by way of example in the drawings, such as three holes or two holes 51. The exit of each hole 51 is placed on the frustum-shaped surface 20 near the end 3B. The holes 51 are inclined with respect to the axis A-A. The hole 51 or each hole 51 can develop along an axis B-B which forms an angle β with the axis A-A of the holder 3. The angle β can range between 10° and 90°, and more specifically between 15° and 90° and even more specifically between 20° and 90°, e.g. between 20° and 60°. The holes form coolant or lubricant fluid dispensing nozzles which are arranged at a distance from the cutting edges 25 of the interchangeable cutting portion 5. The orientation of the holes 51 and the distance thereof from the end 3B of the holder 3 are such that jets of coolant or lubricant fluid projecting from the holes during machining wash the machining area. The fluid jets are slightly diverging from the rotation axis A-A of the tool 1 and will therefore efficiently remove debris from a relatively extensive area around the interchangeable cutting portion of the tool 1. Washing can be performed during machining and if desired also during separate additional steps between subsequent machining operations.

This written description uses examples to disclose the invention, including the best mode, and also to enable any person skilled in the art to practice the invention. The scope of protection is defined by the claims, and may include other examples that occur to those skilled in the art.

Thus, while there has been shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A tool comprising:
an interchangeable cutting portion; and
a holder to which the interchangeable cutting portion is adapted to be replaceably mounted,
wherein the interchangeable cutting portion comprises a first part with at least one cutting edge and a second part for connection to the holder, the second part being provided with a conical external abutment surface and an external cylindrical screw thread; and
wherein the holder is provided with an internal cylindrical screw thread, to which the external screw thread is removably screwed, and a conical internal abutment surface, the conical external abutment surface and the conical internal abutment surface being mutually engageable for positioning the cutting portion and the holder relative to one another;
wherein the holder comprises at least one longitudinal passage for a coolant or lubricant liquid and at least one hole extending from the at least one longitudinal passage to a side surface of the holder.

2. The tool according to claim 1, wherein the interchangeable cutting portion comprises a first axial abutment surface and the holder comprises a second axial abutment surface, the first axial abutment surface and the second axial abutment surface being mutually engageable for axially positioning the interchangeable cutting portion and the holder relative to one another.

3. The tool according to claim 2, wherein the first axial abutment surface and the second axial abutment surface are orthogonal to a rotation axis of the tool.

4. The tool according to claim 2, wherein the position of the first axial abutment surface and the second axial abutment surface and the position of the conical external abutment surface and the conical internal abutment surface are such that when the interchangeable cutting portion of the tool is engaged to the holder, the first axial abutment surface is in surface contact engagement with the second axial abutment surface and the conical internal abutment surface is in surface contact engagement with the conical external surface.

5. The tool according to claim 2, wherein the first axial abutment surface is formed on a planar side of a ring shoulder facing the holder and the second axial abutment surface is formed on a front planar end of the holder facing the interchangeable cutting portion.

6. The tool according to claim 2, wherein the external conical abutment surface projects from the first axial abutment surface of the interchangeable cutting portion.

7. The tool according to claim 1, wherein the external cylindrical screw thread has an outer diameter smaller than a smallest diameter of the conical external abutment surface, and wherein the internal cylindrical screw thread has a diameter smaller than a smallest diameter of the conical internal abutment surface.

8. The tool according to claim 1, wherein the longitudinal passage extends from the internal cylindrical screw thread to an opposite end of the holder.

9. The tool according to claim 8, wherein the interchangeable cutting portion comprises at least one duct which, when the interchangeable cutting portion is mounted on the holder, is in fluid communication with the longitudinal passage and in fluid communication with a side surface of the interchangeable cutting portion, near the at least one cutting edge.

10. The tool according to claim 9, wherein the interchangeable cutting portion comprises a plurality of ducts.

11. The tool according to claim 9, wherein the interchangeable cutting portion comprises a plurality of side holes in fluid communication with the duct and ending in different locations on the side surface of the interchangeable cutting portion near the at least one cutting edge.

12. The tool according to claim 1, wherein the at least one hole of the holder ends on the side surface of the holder near the interchangeable cutting portion.

13. The tool according to claim 1, wherein the at least one hole of the holder is diverging from an axis of the holder.

14. The tool according to claim 1, wherein the at least one hole of the holder is oriented such as to direct a jet of coolant or lubricant fluid towards a machining area and in a direction diverging from an axis of the holder.

15. The tool according to claim 1, wherein the holder comprises a plurality of the holes, uniformly spaced apart from one another around the axis of the holder.

16. The tool according to claim 1, wherein the external cylindrical screw thread and the internal cylindrical screw thread are trapezoidal self-centering threads.

\* \* \* \* \*